United States Patent
Li et al.

(10) Patent No.: US 9,690,477 B2
(45) Date of Patent: Jun. 27, 2017

(54) METHOD AND DEVICE TO ASSOCIATE USER SYMBOLS WITH PREVIOUSLY NON-ASSOCIATED OPERATIONS

(71) Applicant: Lenovo (Singapore) Pte. Ltd., New Tech Park, Singapore (SG)

(72) Inventors: Scott Wentao Li, Cary, NC (US); Russell Speight VanBlon, Raleigh, NC (US); Scott Edwards Kelso, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 128 days.

(21) Appl. No.: 14/579,136

(22) Filed: Dec. 22, 2014

(65) Prior Publication Data

US 2016/0179362 A1  Jun. 23, 2016

(51) Int. Cl.
*G06F 3/0488* (2013.01)
*G06K 9/20* (2006.01)
*G06F 3/01* (2006.01)
*G06F 3/0481* (2013.01)
*G06F 3/0482* (2013.01)

(52) U.S. Cl.
CPC .......... *G06F 3/04883* (2013.01); *G06F 3/017* (2013.01); *G06F 3/0481* (2013.01); *G06F 3/0482* (2013.01); *G06K 9/2081* (2013.01); *G06K 2209/01* (2013.01)

(58) Field of Classification Search
CPC .... G06F 3/017; G06F 3/04883; G06K 9/2081
See application file for complete search history.

(56) References Cited

U.S. PATENT DOCUMENTS

| | | | | |
|---|---|---|---|---|
| 8,499,258 B1* | 7/2013 | Cho | ..................... | G06F 3/04883 715/773 |
| 9,459,794 B1* | 10/2016 | Soegiono | ............ | G06F 3/04883 |
| 2009/0005088 A1* | 1/2009 | Hsu | ..................... | G06F 3/04883 455/466 |
| 2010/0262591 A1* | 10/2010 | Lee | ..................... | G06F 3/04883 707/706 |
| 2015/0169214 A1* | 6/2015 | Kelso | ..................... | G06F 3/0488 715/771 |
| 2015/0205520 A1* | 7/2015 | Yim | ..................... | G06F 3/04883 715/268 |
| 2015/0301702 A1* | 10/2015 | Kim | ..................... | H04N 21/4312 715/810 |

* cited by examiner

*Primary Examiner* — Suezu Ellis
(74) *Attorney, Agent, or Firm* — Dean D. Small; The Small Patent Law Group, LLC

(57) ABSTRACT

Methods, devices, and systems described herein electronically detect a user-generated symbol that is drawn alongside and/or on pre-existing content shown on an output device. As determination is made as to whether the user-generated symbol is previously associated by a device with a defined operation that is to be performed by the device with the pre-existing content responsive to detecting the user-generated symbol. Responsive to determining that the user-generated symbol is not previously associated with the defined operation, a previously non-associated operation that is to be performed by the device with the pre-existing content is determined and implemented on the pre-existing content with the device to generate output provided to a user of the device.

17 Claims, 4 Drawing Sheets

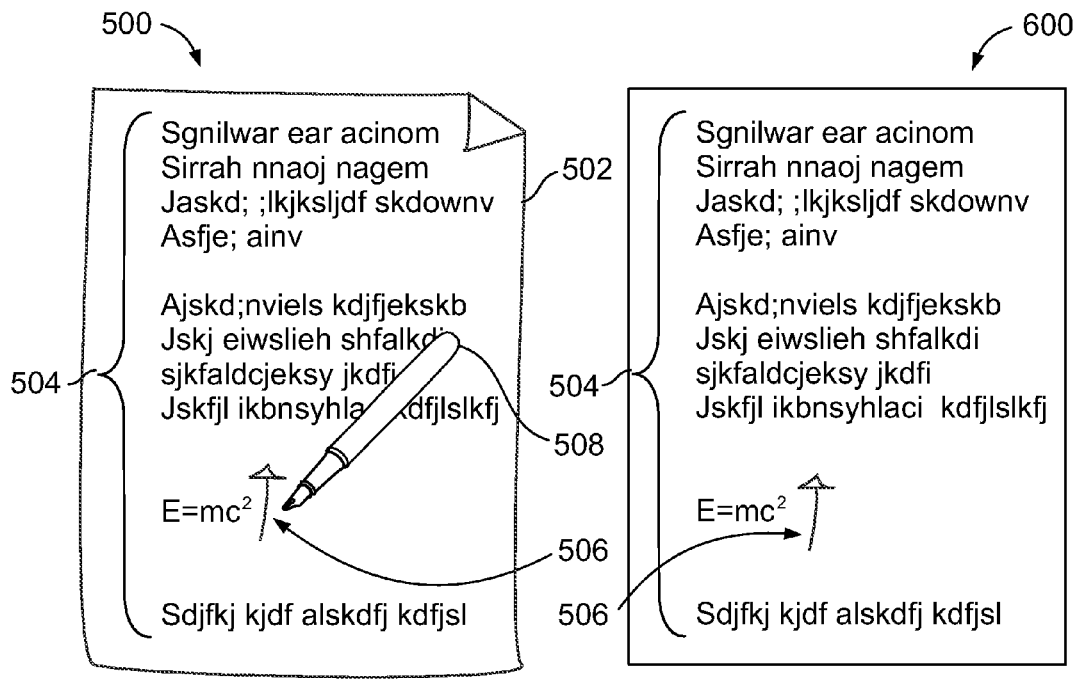
FIG. 5  FIG. 6
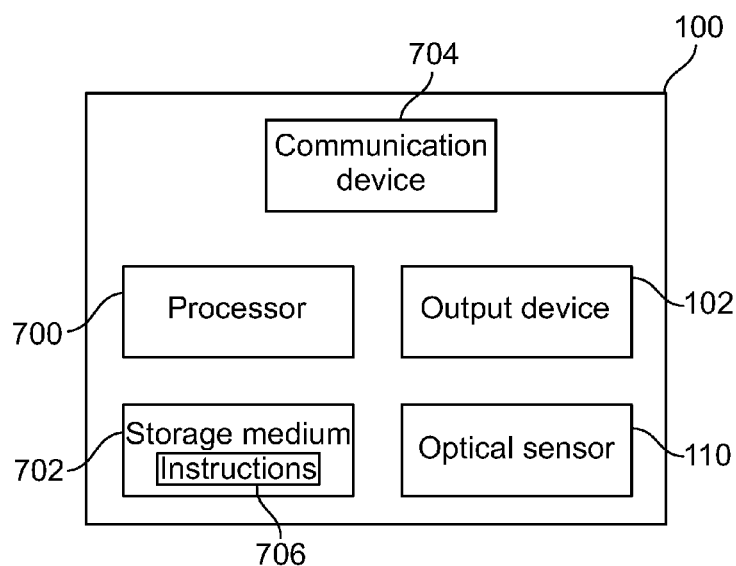
FIG. 7

METHOD AND DEVICE TO ASSOCIATE USER SYMBOLS WITH PREVIOUSLY NON-ASSOCIATED OPERATIONS

FIELD

Embodiments of the present disclosure generally relate to performing operations on documents based on user input.

BACKGROUND

Some known computers allow users to make gestures to cause the computers to perform an action. For example, some mobile phones have pre-stored drawings that users can make on the screens of the phones to cause the phones to perform various actions, such as type certain letters. One problem with this type of operation is that the users must memorize the gestures, drawings, and the like, associated with different actions. Because many actions may be possible, the list of gestures and drawings to memorize can be quite long.

As the number of actions to be performed by the computers increases, the amount of gestures that must be memorized by users increases. Additionally, the increasing number of gestures can cause some gestures to be confusingly similar to other gestures. As a result, the likelihood of human error in inputting gestures to obtain a desired function of a computer increases.

BRIEF SUMMARY

In accordance with one embodiment, a method includes electronically examining a user-generated symbol that is drawn alongside pre-existing content shown on an output device, determining whether the user-generated symbol is previously associated by a device with a defined operation that is to be performed by the device with the pre-existing content responsive to detecting the user-generated symbol, responsive to determining that the user-generated symbol is not previously associated with the defined operation, determining a previously non-associated operation that is to be performed by the device with the pre-existing content, and implementing the previously non-associated operation on the pre-existing content with the device to generate output provided to a user of the device.

In another embodiment, a device includes a processor and a storage medium. The storage medium stores program instructions accessible by the processor. Responsive to execution of the program instructions, the processor examines a user-generated symbol that is drawn alongside pre-existing content shown on an output device, determines whether the user-generated symbol is associated by a device with a previously defined operation that is to be performed by the device with the pre-existing content responsive to detecting entry of the user-generated symbol, determines a previously non-associated operation that is to be performed by the device with the pre-existing content responsive to determining that the user-generated symbol is not previously associated with the previously defined operation, and implements the previously non-associated operation on the pre-existing content with the device to generate output provided to a user of the device.

In another embodiment, a system includes a processor and a storage medium. The storage medium stores program instructions accessible by the processor. Responsive to execution of the program instructions, the processor examines a first symbol received from a first device (where the first symbol is drawn alongside pre-existing content shown on an output device of the first device and is not associated with an operation by the first device), compares the first symbol to a second symbol received from a second device (where the second symbol is previously associated by the second device with an operation to be performed using the first device), and communicates the operation to the first device based on comparing the first symbol to the second symbol for association by the first device with the first symbol.

BRIEF DESCRIPTION OF THE DRAWINGS

FIG. 5 illustrates a document according to another embodiment.

FIG. 6 illustrates an electronic document generated from the document shown in FIG. 5 according to one embodiment.

FIG. 7 illustrates a schematic diagram of the device shown in FIG. 1 according to one embodiment.

DETAILED DESCRIPTION

Figure 1:
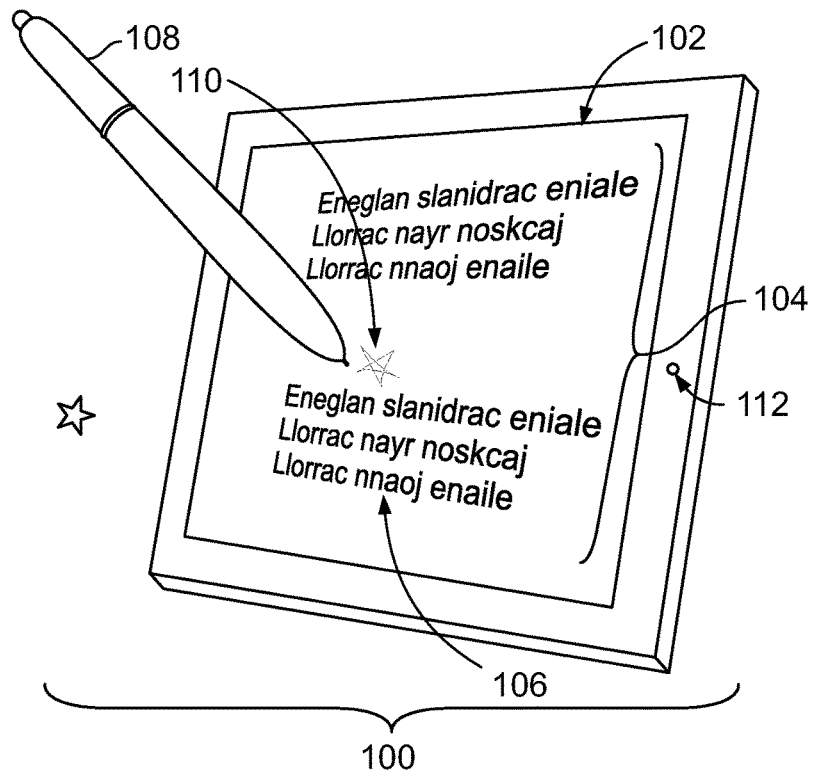
FIG. 1 illustrates one embodiment of a device.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation.

The following description is intended only by way of example, and simply illustrates certain example embodiments.

One or more embodiments of the inventive subject matter described herein provide devices, systems, and methods for examining electronic or hard-copy documents having pre-existing content (e.g., text, diagrams, images, equations, etc.) displayed or printed thereon and user-generated symbols drawn on the documents. The user-generated symbols are examined to determine if the symbols correspond or represent one or more actions (e.g., operations) that are to be taken (e.g., implemented) by the device with the portions of the pre-existing content that are near the symbols.

When a user views a document on a device such as a tablet computer, mobile phone, etc., the user may notate parts of the document for future reference. The term device can refer to any device that handles information, including communication devices. For example, a device can include a mobile phone, a mobile computer, a tablet computer, a desktop computer, a touchscreen, or other device that handles information.

The user may draw asterisks, stars, arrows, underline parts of text, circle parts of an image, boxes, double underlines, etc. These notations are referred to herein as user-generated symbols or gestures. These symbols may include user-generated text, user-generated drawings, or other user-generated notations that are electronically drawn onto the electronically displayed document or that are physically drawn onto a page (e.g., with ink or a pencil) and then converted into electronic form by scanning or taking an image of the page. The symbols may be drawn on top of the pre-existing content and/or alongside (but not over or on) the pre-existing content.

Some user-generated symbols may be associated with operations that are autonomously implemented (e.g., without user interaction) by the device. For example, responsive to detecting entry of a user-generated symbol that is previously associated with copying pre-existing content in the document to another document, the device may automatically copy the pre-existing content to the other document. These symbols may be referred to as associated symbols or operation-associated symbols.

In accordance with one or more embodiments described herein, the methods, systems, and/or devices can learn user-generated symbols that are not associated with any operation, and can automatically learn the operations to be implemented responsive to identifying the user-generated symbols. The symbols do not need to be previously associated with any operation or command. These types of symbols can be referred to as non-associated symbols or no-operation-associated symbols.

FIG. 1 illustrates one embodiment of a device 100. The device 100 can represent a tablet computer, a mobile phone, or other electronic device or device. The device 100 includes an output device 102, such as an electronic display device (e.g., a touchscreen, monitor, non-touchscreen display, etc.). An electronic document 104 is displayed on the output device 102, with the document 104 including pre-existing content 106. The content 106 can represent words, numbers, symbols, drawings, equations, or the like. An input device 108 of the device 100 can be used by a user of the device 100 to draw user-generated symbols 110 onto the electronically displayed document 104. The input device 108 is shown as an electronic stylus, but alternatively can include an electronic mouse or other device. In one embodiment, the input device 108 is a touch sensitive portion of the output device 102. For example, both the output device 102 and the input device 108 can be embodied in a touchscreen.

The user-generated symbol 110 is added to the document 104 after the pre-existing content 106 is added to the document 104. For example, the content 106 may represent text in a book, equations in a textbook, images, or the like, that do not include the user-generated symbol 110 when the document 104 is loaded onto and/or first displayed by the device 100. The user may draw the symbol 110 alongside and/or on the content 106 using the input device 108 during the user's reading or the content 106. For example, the symbol 110 may be drawn on top of or next to one or more portions of the content 106.

The device 100 examines the symbol 110 to determine if the symbol 110 is previously associated with an operation of the device 100. Some symbols 110 may be associated with functions performed by the device 100, such as copying content, deleting content, etc., responsive to detection of the symbols 110. These pre-defined symbols 110 and associated operations may be stored in a storage medium of the device 100 (described herein). If the device 100 determines that the symbol 110 is not previously associated with an operation, the device 100 determines an operation to associate with the symbol 110. For example, the device 100 can determine an operation that is to be performed responsive to detecting the symbol 110 the first time that the symbol 110 is identified and/or subsequent times that the symbol 110 is identified.

Figure 2:
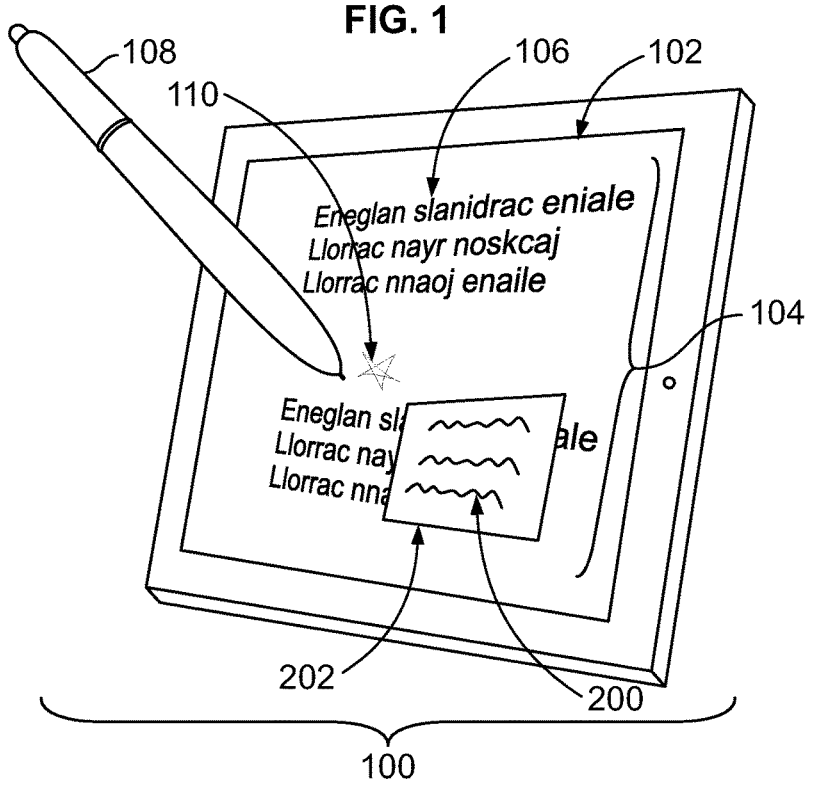
FIG. 2 illustrates one embodiment of the device shown in FIG. 1 in response to detecting a user-generated symbol shown in FIG. 1 that is previously not associated with an operation.

FIG. 2 illustrates one embodiment of the device 100 in response to detecting the user-generated symbol 110 that is previously not associated with an operation. In response to detecting the user-generated symbol 110 being drawn on the document 104, the device 100 may display plural options 200 of operations to be implemented by the device 100 in response to detection of the symbol 110. These options 200 can be referred to as operation options, and can include several different actions to be taken by the device 100, such as copying content 106, labeling or grouping nearby content 106, pasting content 106, or the like. In the illustrated example, the options 200 are displayed in a drop-down menu box 202, but alternatively may be presented in another manner (e.g., clickable icons or buttons along a side of the output device 102). The user may employ the input device 108 to select one or more of the options 200, and the device 100 may then implement the selected option 200.

In one embodiment, the device 100 may thereafter associate the symbol 110 with the user-selected operation option 200. During subsequent entries of the symbol 110 by the user, the device 100 may automatically implement the user-selected operation without presenting options 200 to the user or requiring the user to select an option 200 to implement. Alternatively, the device 100 may present the options 200 to the user each time the symbol 110 is detected.

The device 100 may require that certain criteria be met before a user-generated symbol 110 that is previously not associated with an operation is thereafter associated with operation of the device 100. In one aspect, the device 100 may associate an operation with the symbol 110 responsive to the device 100 determining that the symbol 110 is not associated with any operation and the symbol 110 is within a threshold distance of content 106 as shown in the output device 102. For example, if the symbol 110 is within one or two lines of content 106 (e.g., within one centimeter or another distance of the content 106) and the device 100 does not associate any operation with the symbol 110, then the device 100 may determine and associate an operation with the symbol 110. The threshold distance may be customizable by the user and/or based on the document 104 that is shown on the output device 102. In other embodiments, this threshold distance may be based on the size of a paragraph, a distance to a next word or sentence, a distance to a line or page break, or the like. For example, if the symbol 110 is within the space taken up by one paragraph on the output device 102, within the space taken up by a single word or sentence, within the space between consecutive line or page breaks, or the like, then the symbol 110 may be associated with an operation by the device 100.

As an additional or alternative criterion, the device 100 may track a number of times that a symbol 110 is detected and, if the number of detections exceeds a threshold number of times (e.g., twice, five times, ten times, or the like), then the device 100 can associate the symbol 110 with one or more operations. This process may be used as a filter to eliminate inadvertent marks drawn by the user from being interpreted as symbols 110. The threshold can be modified by the user based on user preferences to make the device 100 more or less likely to implement an operation in response to markings by the user on the document 104.

The device 100 can implement one or more of a number of different operations in response to detecting a non-associated user symbol 110. The following examples are provided, but do not represent an exhaustive list of all possible operations that can be associated with non-associated symbols 110 and performed by the device 100.

In one aspect, the operation that is associated with the symbol 110 can be selection of nearby portions of the content 106 into one or more groups. For example, the content 106 that is within a designated distance (e.g., two centimeters or another distance, a sentence or more, a paragraph or more, an entire page or more, etc.) of the symbol 110 may be flagged or otherwise marked for inclusion in one or more groups. The user and/or device 100 can define these groups. For example, a group may be defined as content 106 that is "to be researched further," content 106 that is "not understood" by the user, content 106 that is "on the test, quiz, or other examination," content 106 that is "needed for memorization," content 106 that is "not required for passing the test, quiz, or examination," content 106 that is "not related to surrounding content or notes," or the like.

The device 100 may use the group of content 106 identified or associated with the same symbol 110 to be displayed the output device 102. For example, after drawing the same symbol 110 near one or more portions of the content 106 in a document 104 (which may comprise many pages or lines of content 106), the device 100 may present the portions of the content 106 that are in the group associated with the symbol 110 to the user on the output device 102, without displaying the remainder of the content 106. This can allow for the user to identify the portions of the content 106 that the user wants to review at a later time (e.g., in preparation for a quiz or test), and ignore or disregard other portions of the content 106. In one aspect, the device 100 may present a reminder or question to the user on the output device 102, such as "review notes" or "would you like to review all notes with the symbol 110?". The user can then respond to the reminder or question using the input device 108 to review the group of content 106 associated with the symbol 110.

In another aspect, the operation may include an editing operation applied to the content 106, such as deleting content 106 that is within the designated distance from the symbol 110, inserting content 106 in a location indicated by the symbol 110, moving content 106 that is within the designated distance of the symbol 110, copying content 106 that is within the designated distance from the symbol 110, cutting content 106 from the document 104 that is within the designated distance from the symbol 110, or the like.

In another aspect, the operation may include communicating the content 106 that is within the designated distance of the symbol 110 to one or more external devices (e.g., devices that are not included in the device 100. For example, the symbol 110 may be associated with an operation that copies and pastes the content 106 within a designated distance of the symbol 110 into an electronic mail message, a text message, a website or blog post, or the like. The operation optionally may send the message and/or post to the website or blog.

In another aspect, the device 100 may automatically determine the operation to be associated with the symbol 110. For example, the user may write additional text near (e.g., within the threshold distance) the symbol 110 and the device 100 may examine to determine what this additional text states and associate an operation with the symbol 110 based on the additional text.

Figure 3:
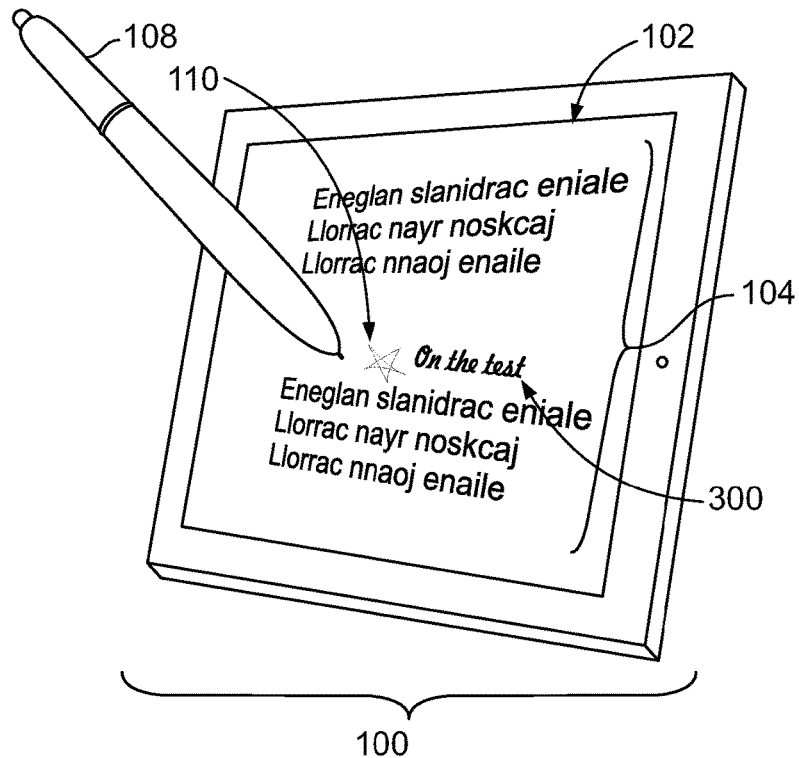
FIG. 3 illustrates another embodiment of the device shown in FIG. 1 automatically determining an operation to associate with the symbol shown in FIG. 1 based on additional text provided by the user.

FIG. 3 illustrates another embodiment of the device 100 automatically determining an operation to associate with the symbol 110 based on additional text 300 provided by the user. As shown in FIG. 3, the user may draw the symbol 110 and additional text 300. The additional text 300 may be words, numbers, other symbols, a combination thereof, etc. The device 100 can, responsive to detecting the symbol 110, examine additional markings made by the user to detect the additional text 300, and decipher the additional text 300 to determine what operation should be associated with the symbol 110. In one aspect, the device 100 can apply an optical character recognition (OCR) technique or algorithm to the additional text 300 to determine what words, symbols, numbers, or the like, are represented by the additional text 300.

In the illustrated example, the additional text 300 states "on the test." The device 100 may examine and decipher this text 300 to determine that the portion of the content 106 in the document 104 that is within the threshold distance of the symbol 110 should be included in a group of portions of the content 106 that is to be presented to the user for review for a test. Alternatively, the additional text 300 may state another operation, such as delete, paste, copy, mail, text, or the like, to cause the device 100 to implement a corresponding operation.

In one embodiment, the user may generate the text 300 and the device 100 can recommend the symbol 110 to the operator. For example, the user may write the text 300 using the input device 108 without drawing the symbol 110. The device 100 can decipher the words, numbers, or the like, represented by the text 300 to determine what operation is to be performed based on the text 300. The device 100 may store symbols 110 representative of different operations in a storage medium (described herein), with the symbols 110 associated with different keywords. For example, a first symbol 110 may be associated in the storage medium with keywords such as "test," "quiz," or "important," a second symbol 110 may be associated in the storage medium with keywords such as "mail," "message," or "send," a third symbol 110 may be associated in the storage medium with keywords such as "cut" or "delete," etc. The device 100 can compare the text 300 with the keywords to calculate a confidence index that the text 300 represents the symbol 110 (and operation) associated with one or more of the keywords. The confidence index can represent a degree of match between the text 300 and the keywords associated with a symbol 110. A larger confidence index for an operation indicates that the text 300 more closely matches the keywords associated with one symbol 110 than a symbol 110 with a smaller confidence index. The device 100 may then select one or more of these symbols 110 having larger confidence indices than other symbols 110, and recommend the symbols 110 with the larger confidence indices to the user for the same text 300 that is provided by the user. In doing so, the device 100 can teach the user a type of shorthand notation that can be used instead of repeatedly writing the text 300 to get the device 100 to perform the same operation.

Figure 4:
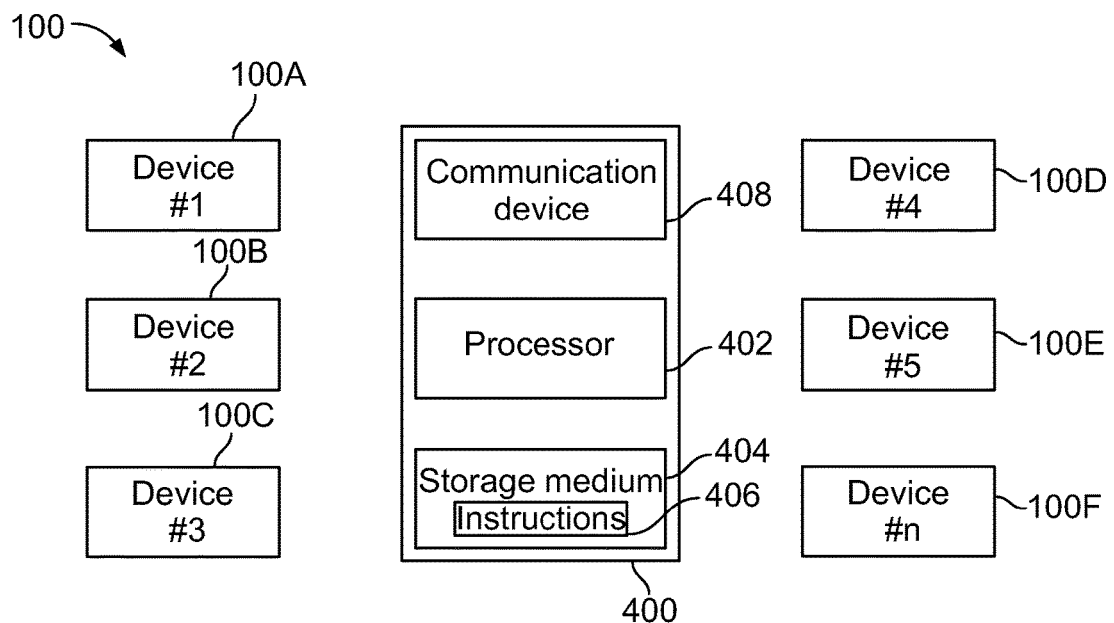
FIG. 4 illustrates one embodiment of a computing system using multi-user collaboration to associate user-generated symbols with operations to be performed by devices.

FIG. 4 illustrates one embodiment of a computing system 400 using multi-user collaboration to associate user-generated symbols 110 with operations to be performed by devices 100. The computing system 400 represents one or more devices (e.g. computers, servers, or the like) that are remotely located from several devices 100 (e.g., devices 100A-F). For example, the computing system 400 can represent a cloud-based system that is communicatively coupled with many devices 100 via wired and/or wireless connections. The number of devices 100 shown in FIG. 4 is provided only as one example, and is not limiting on all embodiments of the subject matter described herein.

The computing system 400 includes hardware circuits and/or circuitry that include and/or are connected with one or more processors (e.g., "processor 402" in FIG. 4, which can represent a microprocessor, microcomputer, application-specific integrated circuit, etc.), a local storage medium 404 having program instructions 406 stored thereon, and a communication device 408. The local storage medium 404 can encompass one or more memory devices of any of a variety of forms (e.g., read only memory, random access memory, static random access memory, dynamic random access memory, etc.) and can be used by the processor 402 to store and retrieve data. The data that is stored by the local storage medium 404 can include, but need not be limited to, images, operating systems, applications, user collected content and informational data. Each operating system includes executable code (e.g., instructions 406) that controls basic functions of the computing system 400, such as interaction among the various components, communication with external devices, and storage and retrieval of applications and data to and from the local storage medium 404. Each application includes executable code that utilizes an operating system to provide more specific functionality for the communication devices. The communication device 408 can represent transceiving circuitry and associated hardware, such as antennas, cables, modems, or the like, that establish wired and/or wireless communication links with the devices 100.

The computing system 400 can receive the symbols 110 entered by many different users on many different devices 100 and the operations locally associated with the symbols 110 by the devices 100. For example, an operation that is associated with a symbol 110 by a device 100 (as described herein) can be referred to as a locally associated operation. The computing system 400 can track the different symbols 110 associated by the different devices 100 with various operations and store this data in the storage medium 404. A device 100A can communicate a symbol 110 detected by the device 100A to the computing system 400 via one or more networks, which may include all or part of the Internet, intranets, or the like. The computing system 400 can compare the received symbol 110 with the symbols 110 and associated operations received from one or more other devices 100B-F. If the symbol 110 received from the device 100A matches the symbols 110 received from one or more other devices 100B-F (as determined by the processor 402), then the computing system 400 may communicate a message to the device 100A of the operation associated with the symbol 110 by one or more of the other devices 100B-F. The device 100A may then associate this operation with the symbol 110 at the device 100A. This can allow for the device 100A to rely on the associations between the symbols 110 and operations determined by other devices 100.

In one aspect, the computing system 400 may compare the symbol 110 received from the device 100A with one or more different sets of symbols 110 and associated operations. The different sets can represent symbols 110 and associated operations received from different locations (e.g., different countries), from documents 104 in different languages, from different documents 104 (e.g., textbooks versus images versus news articles, etc.). Depending on where the device 100A that sends the symbol 110 is located, the language in which the document 104 is written, the type of document 104 that the symbol 110 was written, or the like, the computing system 400 may compare the symbol 110 to a different set of symbols 110. For example, the symbols 110 received from one country may be compared to symbols 110 received from the same country, but not to symbols 110 received from other countries. As another example, the symbols 110 written in documents 104 in one language may be compared to symbols 110 written in documents 104 in the same language, but not to symbols 110 written in documents 104 in another language. As another example, the symbols 110 written in one type of document 104 may be compared to symbols 110 written in documents 104 of the same type, but not to symbols 110 written in documents 104 of another type. This can help to ensure that the appropriate operation is being recommended by the computing system 400 based on the location, language, etc. of the device 100 that is sending the symbol 110.

FIG. 5 illustrates a document 500 according to another embodiment. The document 500 may include a non-electric substrate 502, such as a sheet of paper, a chalkboard, a dry erase board, an easel, or the like, with content 504 printed or otherwise written on the substrate 502. For example, the document 500 may represent a page from a book. A user can write a symbol 506 on the substrate 502, similar to the user writing the symbol 110 on the document 104 shown in FIG. 1. For example, the user can write the symbol 506 using an input device 508, such as a pen, pencil, or brush.

The device 100 (shown in FIG. 1) can include an optical sensor 112, as shown in FIG. 1. This optical sensor 112 can represent a camera that takes a picture of the document 500. Optionally, another optical sensor 112 that is separate from the device 100 can take the picture of the document 500 and send the picture to the device 100. For example, a student can make hand-written notes on pages of a textbook during class and/or study of the book. The student can then take pictures of different pages of the book, with the hand-written notes (e.g., symbols 506) being visible in the pictures.

FIG. 6 illustrates an electronic document 600 generated from the document 500 shown in FIG. 5 according to one embodiment. The electronic document 600 can be the image taken by the optical sensor 112 or another optical sensor. The device 100 can use OCR or another technique to determine the content 504 in the document 500, 600, and can recognize the user-generated symbol 506. The device 100 can then determine if the symbol 506 is associated with an operation and, if not, determine an operation to associate with the symbol 506, as described herein. For example, the device 100 may determine that the upward arrow symbol 506 shown in FIGS. 5 and 6 indicates a copying operation that involves copying the equation shown to the left of the symbol 506 into a document for later study by the user.

FIG. 7 illustrates a schematic diagram of the device 100 shown in FIG. 1 according to one embodiment. As described above, the device 100 can include the output device 102 and/or the optical sensor 112. The device 100 may include one or more processors 700, one or more local storage media 702, and a communication device 704.

The processor 700 represents hardware circuits and/or circuitry that include and/or are connected with one or more processors (e.g., a microprocessor, microcomputer, application-specific integrated circuit, etc.). The local storage medium 702 can encompass one or more memory devices of any of a variety of forms (e.g., read only memory, random access memory, static random access memory, dynamic random access memory, etc.) and can be used by the processor 700 to store and retrieve data. The data that is stored by the local storage medium 702 can include, but need not be limited to, images, operating systems, applications, user collected content and informational data. Each operating system includes executable code (e.g., instructions 706) that controls basic functions of the device 100, such as interaction among the various components, communication with external devices, and storage and retrieval of applications and data to and from the local storage medium 702. Each application includes executable code that utilizes an operating system to provide more specific functionality for the communication devices.

Figure 8:
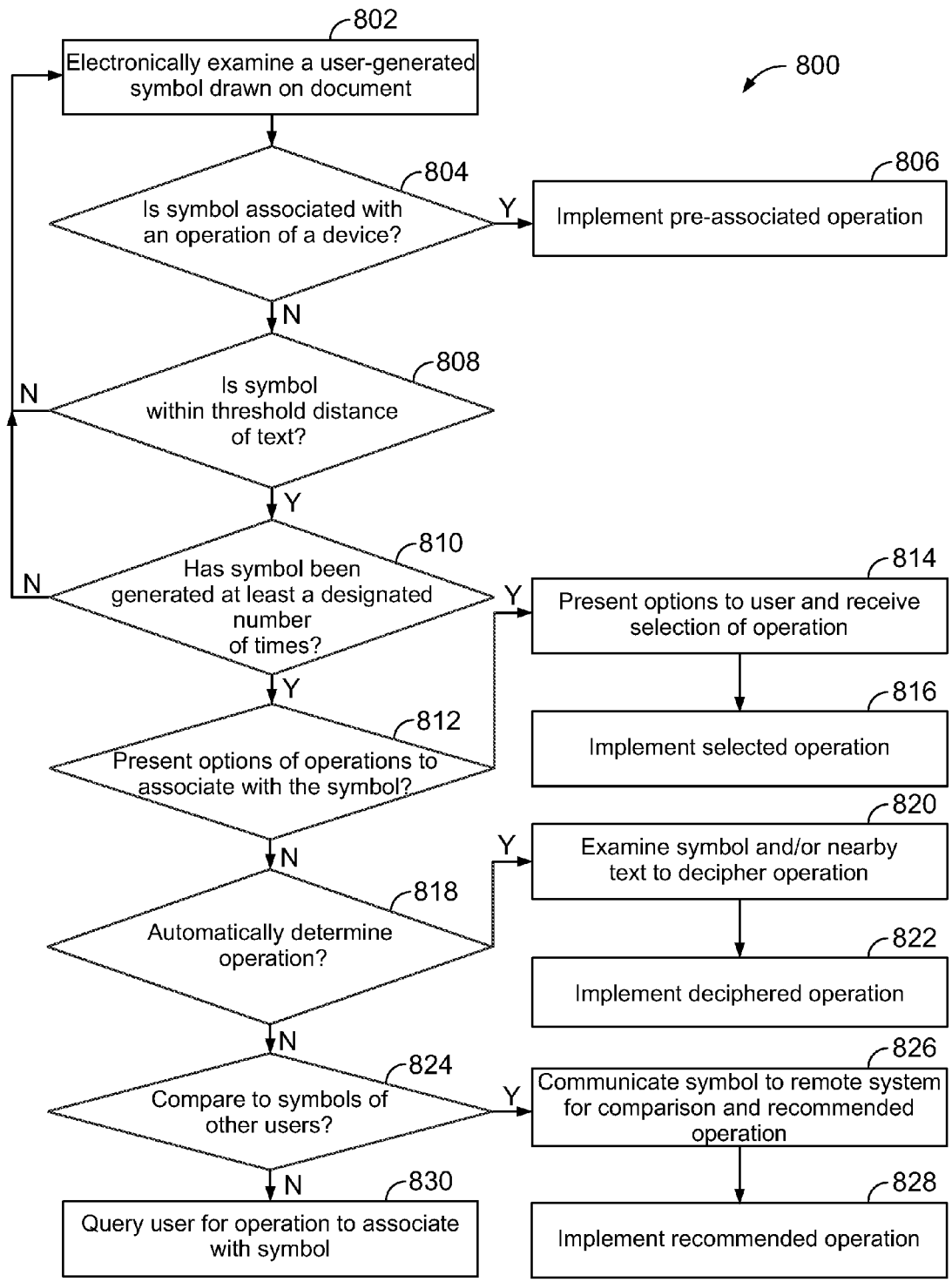
FIG. 8 illustrates a flowchart of one embodiment of a method for associating user-generated symbols with operations performed by a device and previously not associated with the symbols.

FIG. 8 illustrates a flowchart of one embodiment of a method 800 for associating user-generated symbols with operations performed by a device and previously not associated with the symbols. The method 800 may be performed by one or more embodiments of the device 100 and/or system 400 described herein. The order of the operations in the flowchart is not limiting on all embodiments of the method 800. Additionally, one or more operations in the flowchart may be removed from the method 800.

At 802, a user-generated symbol drawn on a document is electronically examined. The symbol may be drawn onto an electronic display of a document, may be drawn onto an electronic display of an image of a document, and/or may be drawn onto the document and then a picture may be taken of the document and the symbol. A device examines the symbol.

At 804, a determination is made as to whether the symbol is already associated with an operation of the device. Several symbols may be previously defined to represent different operations of the device. If the symbol matches one or more of these symbols that already are associated with operations, then flow of the method 800 can proceed to 806. At 806, the operation previously associated with the symbol is performed by the device. For example, the device can copy content associated with the symbol, send content associated with the symbol, delete content associated with the symbol, send content associated with the symbol to another user, or the like.

On the other hand, if the symbol is not already associated with an operation, then flow of the method 800 optionally may proceed to 808. At 808, a determination is made as to whether the symbol is within the threshold distance of content in the document. If the symbol is not within the threshold distance, then the symbol may not have been drawn by the user to direct the device to take some action with respect to the content in the document. Instead, the symbol may be an inadvertent marking or other marking. If the symbol is not within the threshold distance, then flow of the method 800 can return to 802 for examination of another symbol. If the symbol is within the threshold distance, then flow of the method 800 can optionally proceed to 810.

At 810, a determination is made as to whether the symbol has been generated by the user at least a designated number of times. If the symbol has not been generated at least the designated number of times, then the symbol may not have been drawn by the user to direct the device to take some action with respect to the content in the document. Instead, the symbol may be an inadvertent marking or other marking. If the symbol has not been generated at least the designated number of times, then flow of the method 800 can return to 802 for examination of another symbol. If the symbol has been generated at least the designated number of times, then flow of the method 800 can optionally proceed to 812.

At 812, a determination is made as to whether the device is to present options of operations to associate with the symbol. If these options are to be presented to the user, then flow of the method 800 can proceed to 814. Otherwise, flow can optionally continue to 818. At 814, options of operations to associate with the symbol are presented to the user. For example, a drop-down menu, list, grid, or other representation of several different operations may be displayed on the device. The user may provide input into the device to select one or more of these options. At 816, the selected operation(s) is associated with the symbol and optionally implemented by the device.

At 818, a determination is made as to whether an operation is to be automatically determined by the device. For example, the device may attempt to determine what operation is intended to be associated with the symbol, without user intervention. If the operation is to be automatically determined, then flow of the method 800 can proceed to 820. Otherwise, flow of the method 800 optionally can proceed to 824.

At 820, the symbol and/or nearby content are examined by the device to decipher the operation to be associated with the symbol. For example, the device may determine what words are written by the user near (e.g., within the threshold distance) the symbol using OCR or another technique. Based on this content, the device may attempt to determine what operation is intended by the user. The device may associate the operation with the symbol. Optionally, flow of the method 800 may then proceed to 822, where the associated operation is implemented by the device.

At 824, a determination is made as to whether the symbol is to be compared to symbols of other users and/or other devices to determine what operation to associate with the symbol. For example, the symbol can be communicated to a remote computing system that compares the symbol with other symbols associated with operations by other users. If the symbol is to be compared to symbols of other users to determine which operation to associate with the symbol, then flow of the method 800 may proceed to 826. Otherwise, flow of the method 800 can proceed to 830.

At 826, the symbol is communicated to the remote computing system and is compared with symbols that are provided by other users and that are associated with operations. Depending on which of the other symbols that the symbol examined at 802 matches or otherwise corresponds to, one or more operations associated with the matching other symbol or symbols can be communicated to the device. At 828, the operation that is communicated to the device optionally may be implemented by the device and/or associated with that symbol.

At 830, the user may be queried to determine which operation to associate with the symbol examined at 802. For example, the device may ask the user for an instruction on which operation to perform when the same symbol is drawn by the user in the future.

After the symbol that previously was not associated with an operation is associated with an operation, future uses of that symbol may cause the device to implement the associated operation, as described above in connection with 804 and 806.

In accordance with at least one embodiment herein, to the extent that mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code embodied on a storage medium may be transmitted using any appropriate medium, including but not limited to, wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

Although illustrative example embodiments have been described herein with reference to the accompanying figures, it is to be understood that this description is not limiting and that various other changes and modifications may be affected therein by one skilled in the art without departing from the scope or spirit of the disclosure.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller" or processor. The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method comprising:
   electronically detecting a user-generated symbol that is drawn alongside pre-existing content shown on an output device;
   determining whether the user-generated symbol is previously associated by a device with a defined operation that is to be performed by the device on the pre-existing content responsive to detecting the user-generated symbol;
   responsive to determining that the user-generated symbol is not previously associated with the defined operation and determining that the user-generated symbol is within a designated distance threshold of the pre-existing content, determining a previously non-associated operation that is to be performed by the device with the pre-existing content; and
   implementing the previously non-associated operation on the pre-existing content with the device to generate output provided to a user of the device.

2. The method of claim 1, wherein electronically detecting the user-generated symbol includes generating an electronic image of the pre-existing content and the user-generated symbol and examining the electronic image to identify the user-generated symbol.

3. The method of claim 1, further comprising determining how often the user-generated symbol is identified alongside the pre-existing content, wherein the previously non-associated operation is determined responsive to the user-generated symbol being identified at least a threshold number of times.

4. The method of claim 1, wherein determining the previously non-associated operation includes displaying plural operation options to the user responsive to determining that the user-generated symbol is not previously associated with the previously defined operation and receiving a user selection of at least one of the operation options.

5. The method of claim 1, wherein implementing the previously non-associated operation includes grouping a portion of the pre-existing content that are within the designated distance threshold of the user-generated symbol into an output group and displaying the portion of the pre-existing content to the user on the device without displaying other portions of the pre-existing content.

6. The method of claim 1, wherein implementing the previously non-associated operation includes grouping a portion of the pre-existing content that are within the designated distance threshold of the user-generated symbol into an output group and generating a reminder to the user to review the portion of the pre-existing content with the device.

7. The method of claim 1, wherein implementing the previously non-associated operation includes editing a portion of the pre-existing content that is within the designated distance threshold of the user-generated symbol according to an editing operation associated with the user-generated symbol.

8. The method of claim 1, wherein implementing the previously non-associated operation includes grouping a portion of the pre-existing content that is within the designated distance threshold of the user-generated symbol into an output group and communicating the portion of the pre-existing content to an external device without communicating other portions of the pre-existing content to the external device.

9. The method of claim 1, wherein determining the previously non-associated operation includes identifying a portion of the pre-existing content that is within the designated distance threshold of the user-generated symbol, applying optical character recognition to the portion of the pre-existing content using the device, and determining the previously non-associated operation based on the optical character recognition applied to the portion of the pre-existing content.

10. The method of claim 1, wherein determining the previously non-associated operation includes comparing the user-generated symbol with other symbols generated by other users and selecting the previously non-associated operation from among a set of operations previously associated with the other symbols based on comparing the user-generated symbol with the other symbols.

11. A device comprising:
    a processor; and
    a memory storing program instructions accessible by the processor, wherein, responsive to execution of the program instructions, the processor:
    detects a user-generated symbol that is drawn alongside pre-existing content shown on an output device;
    determines whether the user-generated symbol is associated by a device with a previously defined operation that is to be performed by the device on the pre-existing content responsive to detecting the user-generated symbol;
    determines a previously non-associated operation that is to be performed by the device with the pre-existing content responsive to determining that the user-generated symbol is not previously associated with the previously defined operation and determining that the user-generated symbol is within a designated distance threshold of the pre-existing content; and
    implements the previously non-associated operation on the pre-existing content with the device to generate output provided to a user of the device.

12. The device of claim 11, wherein the output device includes a non-electronic substrate and further comprising an optical sensor that is directed by the processor to generate an electronic image of the pre-existing content and the user-generated symbol for detection by the processor to identify the user-generated symbol.

13. The device of claim 11, wherein the processor determines how often the user-generated symbol is identified alongside the pre-existing content, and determines the previously non-associated operation responsive to the user-generated symbol being identified at least a threshold number of times.

14. The device of claim 11, further comprising an electronic display device directed by the processor to display plural operation options to the user responsive to the processor determining that the user-generated symbol is not previously associated with the previously defined operation, wherein the processor determines the previously non-associated operation responsive to receiving a user selection of at least one of the operation options.

15. The device of claim 11, wherein the processor implements the previously non-associated operation by grouping a portion of the pre-existing content that is within the designated distance threshold of the user-generated symbol into an output group, and further comprising an electronic display device directed by the processor to display the portion of the pre-existing content without displaying other portions of the pre-existing content.

16. The device of claim 11, wherein the processor implements the previously non-associated operation by grouping a portion of the pre-existing content that is within the designated distance threshold of the user-generated symbol into an output group and generating a reminder to the user to review the portion of the pre-existing content.

17. A system comprising:
a processor; and
a memory storing program instructions accessible by the processor, wherein, responsive to execution of the program instructions, the processor:
  determines whether a user-generated symbol drawn alongside pre-existing content on a device is associated by the device with a previously defined operation that is to be performed by the device on the pre-existing content;
  determines a previously non-associated operation that is to be performed by the device with the pre-existing content responsive to determining that the user-generated symbol is not previously associated with the previously defined operation and determining that the user-generated symbol is within a designated distance threshold of the pre-existing content; and
  implements the previously non-associated operation on the pre-existing content with the device to generate output provided to a user of the device.

* * * * *